(12) United States Patent
Fuhrmann et al.

(10) Patent No.: US 7,572,178 B2
(45) Date of Patent: Aug. 11, 2009

(54) SYSTEM HOUSING, IN PARTICULAR FOR A HEATING, VENTILATING AND/OR AIR-CONDITIONING SYSTEM OF A VEHICLE

(75) Inventors: Lutz Fuhrmann, Weitramsdorf (DE); Stefan Frenzel, Gleichamberg (DE)

(73) Assignee: Valeo Klimasysteme GmbH, Roadach (DE)

( * ) Notice: Subject to any disclaimer, the term of this patent is extended or adjusted under 35 U.S.C. 154(b) by 351 days.

(21) Appl. No.: 11/447,799

(22) Filed: Jun. 6, 2006

(65) Prior Publication Data

US 2007/0000640 A1    Jan. 4, 2007

(30) Foreign Application Priority Data

Jul. 1, 2005    (DE)    ........................ 10 2005 030 885

(51) Int. Cl.
  *B60H 1/00*    (2006.01)
  *B60H 1/32*    (2006.01)
(52) U.S. Cl. ........................ 454/121; 454/69; 454/142; 454/143; 454/156; 165/42
(58) Field of Classification Search .................. 454/69, 454/121, 127, 143, 156, 159, 142; 165/42
See application file for complete search history.

(56) References Cited

U.S. PATENT DOCUMENTS

| 4,582,252 | A |   | 4/1986 | Ogihara et al. |
| 5,673,964 | A | * | 10/1997 | Roan et al. ................... 296/208 |
| 5,711,368 | A | * | 1/1998 | Ito et al. ........................ 165/42 |
| 5,954,578 | A | * | 9/1999 | Takasaki ..................... 454/121 |
| 6,045,444 | A | * | 4/2000 | Zima et al. ................... 454/121 |
| 6,142,864 | A | * | 11/2000 | Uemura et al. .............. 454/121 |
| 6,394,527 | B2 | * | 5/2002 | Ohno et al. ..................... 296/72 |
| 6,422,301 | B1 | * | 7/2002 | Scoccia et al. ................ 165/42 |
| 6,425,818 | B1 | * | 7/2002 | Auvity et al. ............... 454/121 |
| 6,482,082 | B1 | * | 11/2002 | Derleth et al. .............. 454/156 |
| 6,786,278 | B2 | * | 9/2004 | Ku ............................... 165/204 |
| 6,789,607 | B1 | * | 9/2004 | Jun et al. ....................... 165/43 |
| 2006/0000595 | A1 | * | 1/2006 | Kang et al. ................. 165/203 |

FOREIGN PATENT DOCUMENTS

| DE | 9420 291 U1 | 11/1995 |
| DE | 19753178 A1 | 6/1999 |
| DE | 199 43 278 A1 | 3/2001 |
| DE | 600 03 136 T2 | 5/2004 |
| JP | 58202106 A * | 11/1983 |
| JP | 2004249917 A * | 9/2004 |

* cited by examiner

*Primary Examiner*—Steven B McAllister
*Assistant Examiner*—Patrick F. O'Reilly, III
(74) *Attorney, Agent, or Firm*—Howard & Howard Attorneys PLLC

(57) ABSTRACT

System housing, in particular for a heating, ventilating and/or air-conditioning system of a vehicle, comprising at least three housing parts, which serve for accommodating air-conditioning-system components and/or for forming air-channeling paths, one of the housing parts comprising a first abutment surface and a second abutment surface, up to which the other two housing parts can be advanced in each case parallel to a normal vector of the abutment surface which is advanced up in each case.

6 Claims, 6 Drawing Sheets

SYSTEM HOUSING, IN PARTICULAR FOR A HEATING, VENTILATING AND/OR AIR-CONDITIONING SYSTEM OF A VEHICLE

BACKGROUND OF THE INVENTION

The present invention relates to a system housing, in particular for a heating, ventilating and/or air-conditioning system of a vehicle, comprising at least three housing parts, which serve for accommodating air-conditioning-system components and/or for forming air-channeling paths, as described by the preamble of the independent claim.

System housings for heating, ventilating and/or air-conditioning systems are usually provided by injection molding in the prior art. In the design, the person skilled in the art has to ensure, inter alia, that the housing has a high level of sealing and that the number of steps required for assembly purposes is as small as possible.

Up until now, housings have usually been provided by two injection moldings. In this case, one injection molding is a bottom or base part and the other is a top or head part and a central part. These are brought into abutment with one another and connected by means of screw connection or the like. The reason for subdividing the housing into two parts is based on the fact that the system housing is to have the fewest possible connections to the surrounds, on the one hand, in order for it to be possible to provide the necessary level of sealing and also in order for it to be possible to ensure the necessary rigidity and vibration resistance.

The disadvantage here is that air-directing elements, in particular air flaps, usually take a lot of time to install in the system housing since the shapes are too complex, or are not possible to reproduce, for injection molding. The installation of the additional elements here gives rise to high assembly and maintenance outlay. The poor internal sealing between the housing parts and the plugged-in air-directing elements is a further disadvantage.

The object of the invention is thus to provide a system housing which is easier, quicker and thus more cost-effective to produce and assemble and which ensures sufficient levels of sealing, stability and vibration resistance for the housing parts.

This object is achieved by the features of the independent patent claim, expedient developments being described by the features of the dependent claims.

BRIEF SUMMARY OF THE INVENTION

The present invention proposes, in particular, a system housing, in particular for a heating, ventilating and/or air-conditioning system of a vehicle, comprising at least three housing parts, which serve for accommodating system components and/or for forming air-channeling paths, one of the housing parts comprising a first abutment surface and a second abutment surface, up to which the other two housing parts can be advanced in each case essentially parallel to a normal vector of the respective abutment surface.

The basic idea of the present invention is to divide up a complex system housing into geometrical housing parts such that essentially all the functional units, for example air channels, air flaps and the like, can be provided by means of just one process step. It is only during a subsequent assembly operation that the housing parts are connected to one another such that they engage one behind the other and are torsionally rigid.

The abutment surfaces here are conceived of essentially as planes, it also being possible for integrally formed air-directing elements, stiffening elements and connecting devices to project out of the planes. These are guided into corresponding recesses of the other housing parts and thus also increase the torsional rigidity of the system housing overall.

During assembly, in the first instance, one housing part is advanced up to the housing part with the two abutment surfaces, the parallel direction of advancement also allowing the formation of housing parts which project far out of the surface, and connected to this housing part, for example, by means of screw connections or the like. In a further step, at least one further housing part is advanced up to the further abutment surface, in which case it is possible for it to be connected not just to the adjacent housing part.

The normal vectors advantageously run essentially parallel. It is thus straightforwardly possible to provide easy assembly in a single plane.

Furthermore, it is advantageous if at least the housing part with the two abutment surfaces is constructed from a first portion and a second portion. These housing parts may already provide air channels with the corresponding components, e.g. air flaps. This makes it possible to reach, during assembly, connecting devices which are located within the housing.

It is additionally advantageous if the portions can be brought into engagement at right angles in relation to the direction of advancement of the two housing parts. It can thus be ensured that the greatest possible amount of installation space is available for the adjacent components and that, during installation of the system housing, all that has to be ensured is that the space above the portions remains freely accessible.

It is advantageous if at least the housing part with the two abutment surfaces is constructed from an essentially u-shaped portion and from an essentially t-shaped portion.

The t-shaped portion can be introduced into the u-shaped portion such that the u-shaped portion is subdivided into two air channels, so that air channels can easily be provided for associated air-conditioning zones in the vehicle interior. In a preferred embodiment, it is also the case that the line of symmetry of the at least three housing parts in the assembled state lies along the leg of the t-shaped portion.

The housing parts and/or portions advantageously comprise air-directing elements, in particular air flaps. The person skilled in the art is aware of a large number of air-flap shapes and forms or further air-directing elements. It is possible here for the air flaps even to be provided with stiffening struts or the like in order to increase the stability of the system housing.

Furthermore, it is advantageous if sealing lips are provided on the housing parts and/or portions. Sealing lips can easily be integrally formed, for example, by means of so-called two-component injection molding.

It is additionally advantageous if screw connections, latching connections and tongue/groove connections are provided on the housing parts and/or portions. A combination of screw connections, latching connections and tongue/groove connections can be used to provide the necessary level of sealing for the system housing.

The housing parts and/or portions are advantageously undercut-free injection moldings in each case.

The housing parts can be provided easily, quickly and cost-effectively by means of injection molding. Those parts which have to be of movable configuration can be provided, for example, by means of so-called film-hinge technology or the like. Flexible parts, for example sealing lips, may be provided by means of two-component injection molding.

BRIEF DESCRIPTION OF THE SEVERAL VIEWS OF THE DRAWINGS

Further features and advantages of the invention will become clearer on reading the following description of a preferred embodiment, which is given merely by way of example, is not intended to be restrictive in any way and is provided with reference to the attached drawings, in which.

DETAILED DESCRIPTION OF THE INVENTION

The embodiment which is shown in the figures illustrates a system housing, or parts thereof, for a so-called four-zone air-conditioning system of a motor vehicle. This system provides four independent air-conditioning zones in the vehicle interior.

Figure 1:
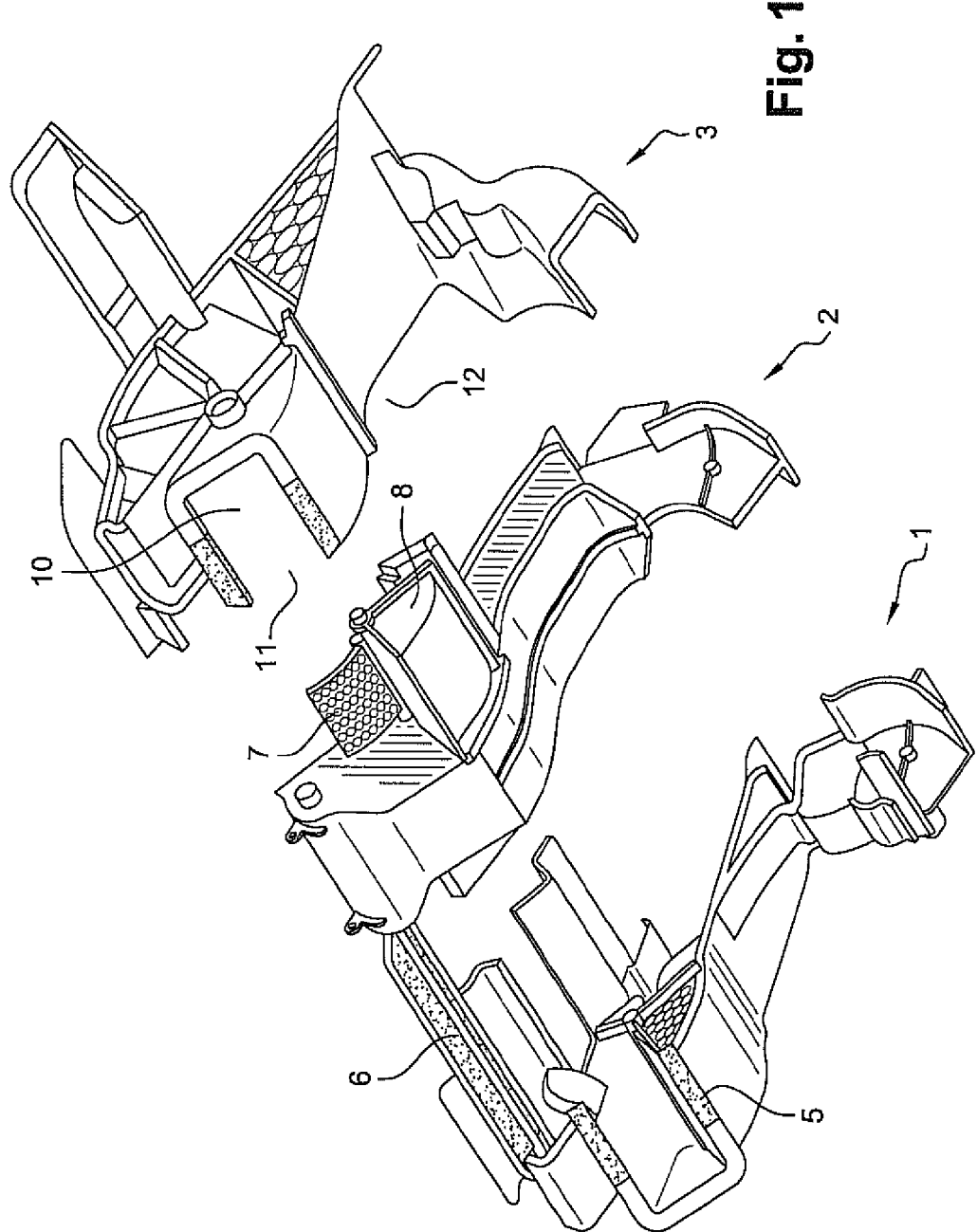
FIG. 1 shows a perspective illustration of three housing parts of a system housing according to the invention prior to assembly.

FIG. 1 shows a perspective illustration of a first housing part 1, a second housing part 2 and a third housing part 3 of a system housing according to the invention prior to assembly. The housing parts 1, 3 are produced essentially in one piece in each case by means of injection molding. The first housing part 1 here is designed as a left-hand air-distributor housing, the second housing part 2 is designed as a central air-distributor housing and the third housing part 3 is designed as a right-hand air-distributor housing.

Air flaps 5, 6, 7, 8 are integrally formed on the housing parts 1, 2 and can be pushed into respective corresponding recesses 10, 11, 12 of the other housing parts 2, 3. The flaps 5, 6, 7, 8 are mounted in a movable manner, for example, by means of a so-called shaft/hub connection.

It can clearly be seen in FIG. 1 how the housing parts 1, 3 are advanced up to the central housing part 2 and can be brought into abutment therewith. Tongue/groove connections, stabilizing projections and screw-connecting bushings are integrally formed on the housing parts 1, 2, 3. The combination of these means ensures a high level of sealing for the system housing. It is also possible, at critical connections, to form sealing lips on the housing parts 1, 2, 3 by means of so-called two-component injection molding.

Figure 2:
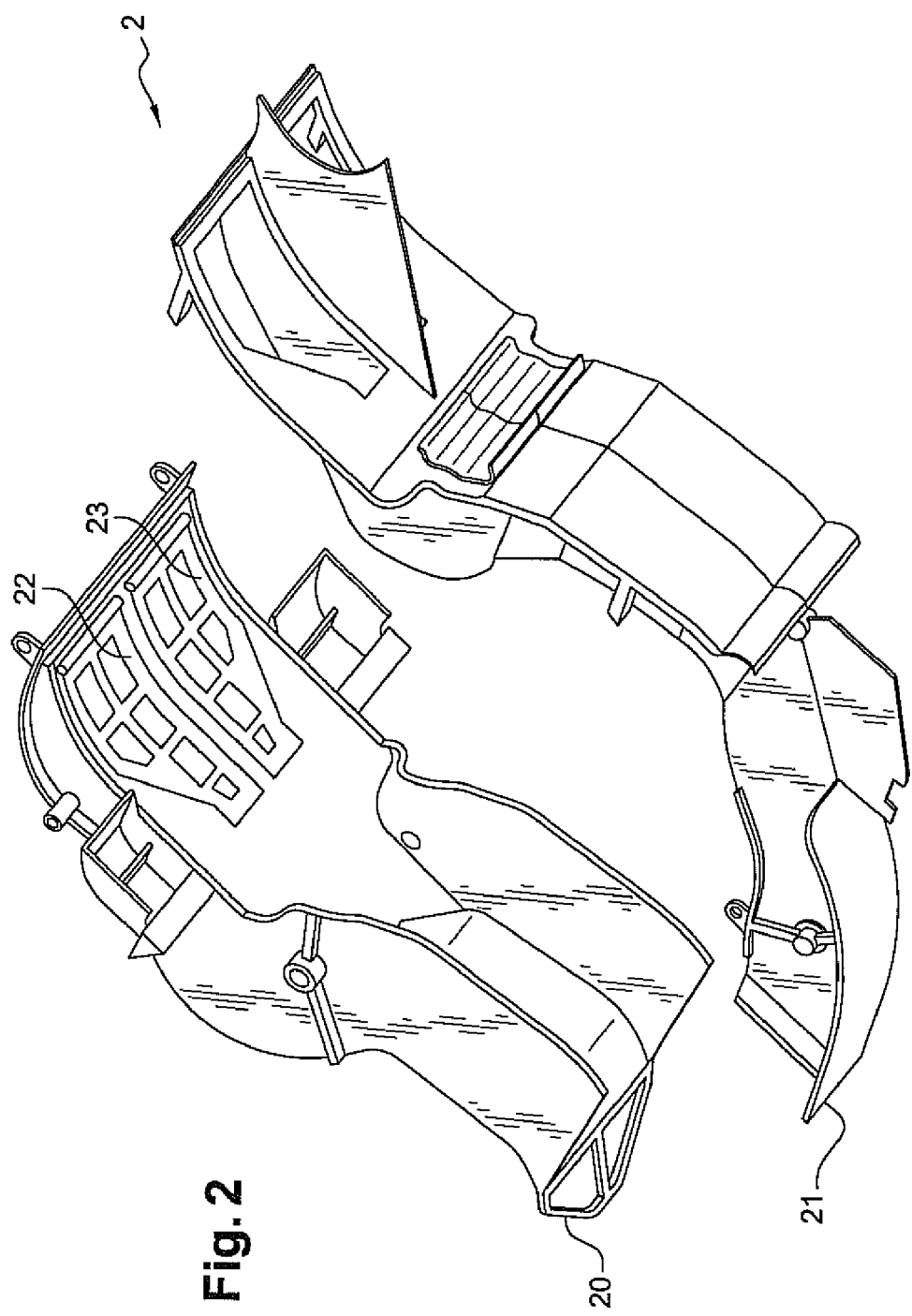
FIG. 2 shows a perspective view of the central housing part from FIG. 1, in the non-assembled state but with air flaps already mounted.

FIG. 2 shows a perspective view of the central housing part 2 from FIG. 1. The central housing part 2 comprises an essentially u-shaped portion 20 and an essentially t-shaped portion 21. The portions 20, 21 are likewise produced in one piece by means of injection molding. Air flaps 22, 23 are mounted on the u-shaped portion 20.

It can clearly be seen in FIG. 2 how the portions 20, 21 are displaced one inside the other, so that the u-shaped portion 20 is divided up into two air channels, each comprising an air flap 22, 23, the central wall being provided by the t-shaped portion 21. The portions 20, 21 are connected to one another in a sealed manner by means of screw connections or tongue/groove connections.

Figure 3:
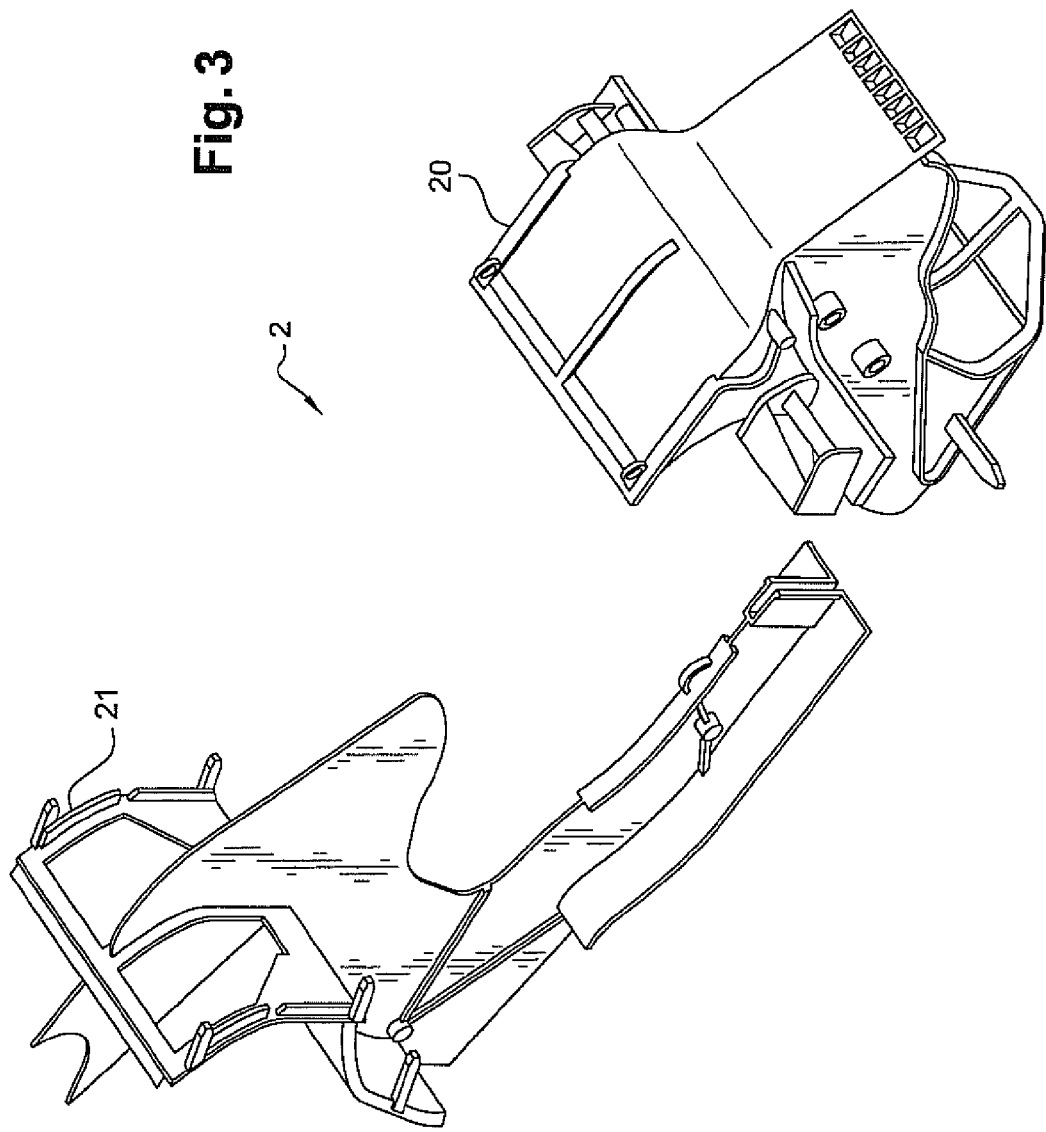
FIG. 3 shows the central housing part 2 from FIG. 2 turned through 180°, in the non-assembled state.

FIG. 3 shows the central housing part 2 from FIG. 2 turned through 180°. It can clearly be seen in FIG. 3 how the t-shaped portion 21 can be pushed into the u-shaped portion 20 to form two air channels.

Figure 4:
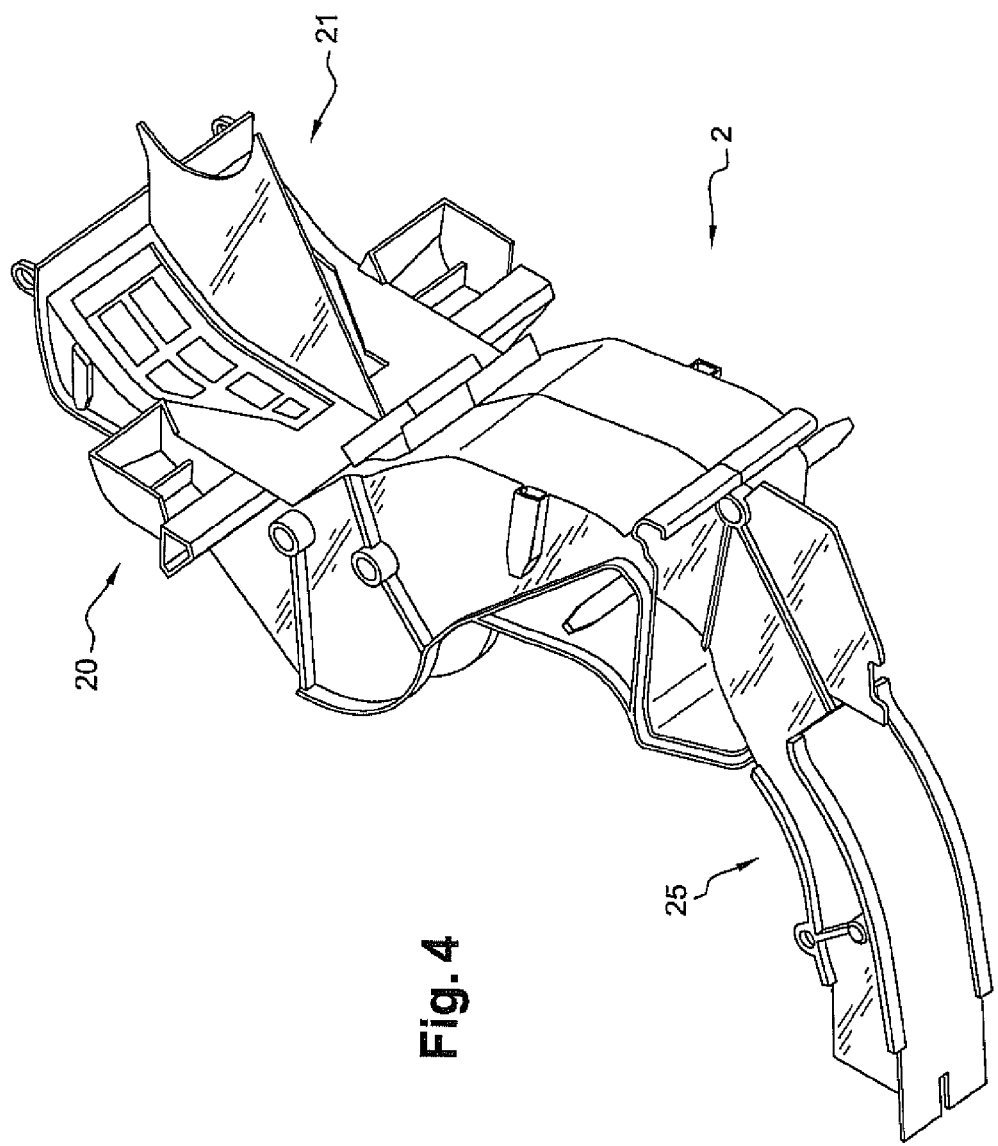
FIG. 4 shows the central housing part from FIG. 2, the portions having been assembled.

FIG. 4 shows the central housing part 2 from FIG. 2, with the u-shaped portion 20 and t-shaped portion 21 connected. As can be seen in FIG. 4, the u-shaped portion 20, rather than extending over the entire portion 21, extends only over the top region of the latter. The region 25, over which the u-shaped portion 20 does not extend, is covered over by the housing parts 1, 3, so that air channels are also formed in this region.

Figure 5:
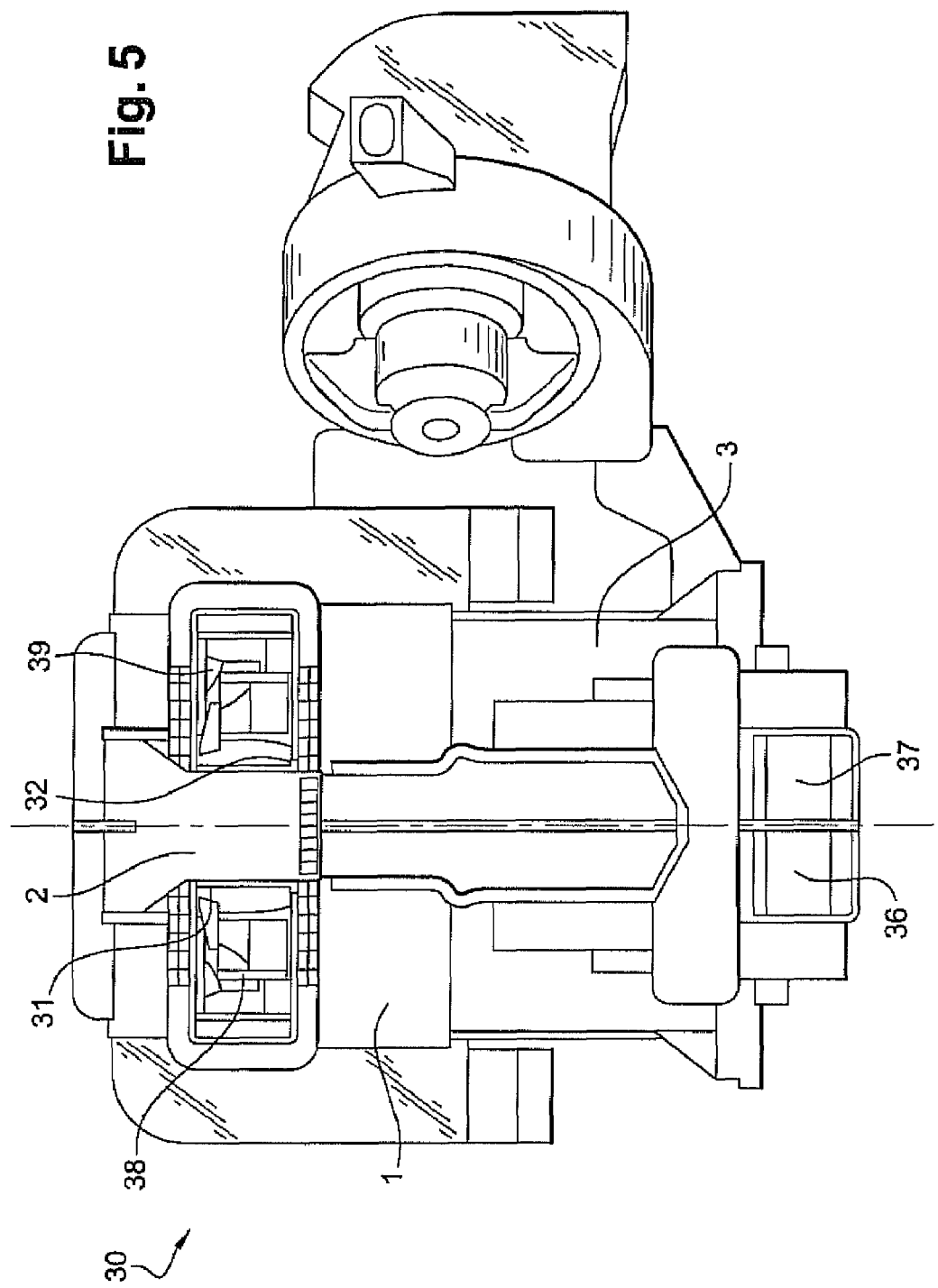
FIG. 5 shows a front view of a system housing according to the invention.

FIG. 5 shows a front view of system housing 30 according to the invention. The abutment surfaces 31, 32 between the housing parts 1, 2, 3 have been emphasized. The housing parts 1, 2, 3 are connected to one another. It cannot be seen in FIG. 5 that the housings 1 and 3 together form the housing for the heat exchanger.

The air channels 36, 37, 38, 39 formed by the housing parts 1, 2, 3 can be seen particularly clearly in FIG. 5. The essentially symmetrical construction of the housing parts 1, 2, 3 in the connected state is likewise clear to see. The line of symmetry here runs through the central housing part 2.

Figure 6:
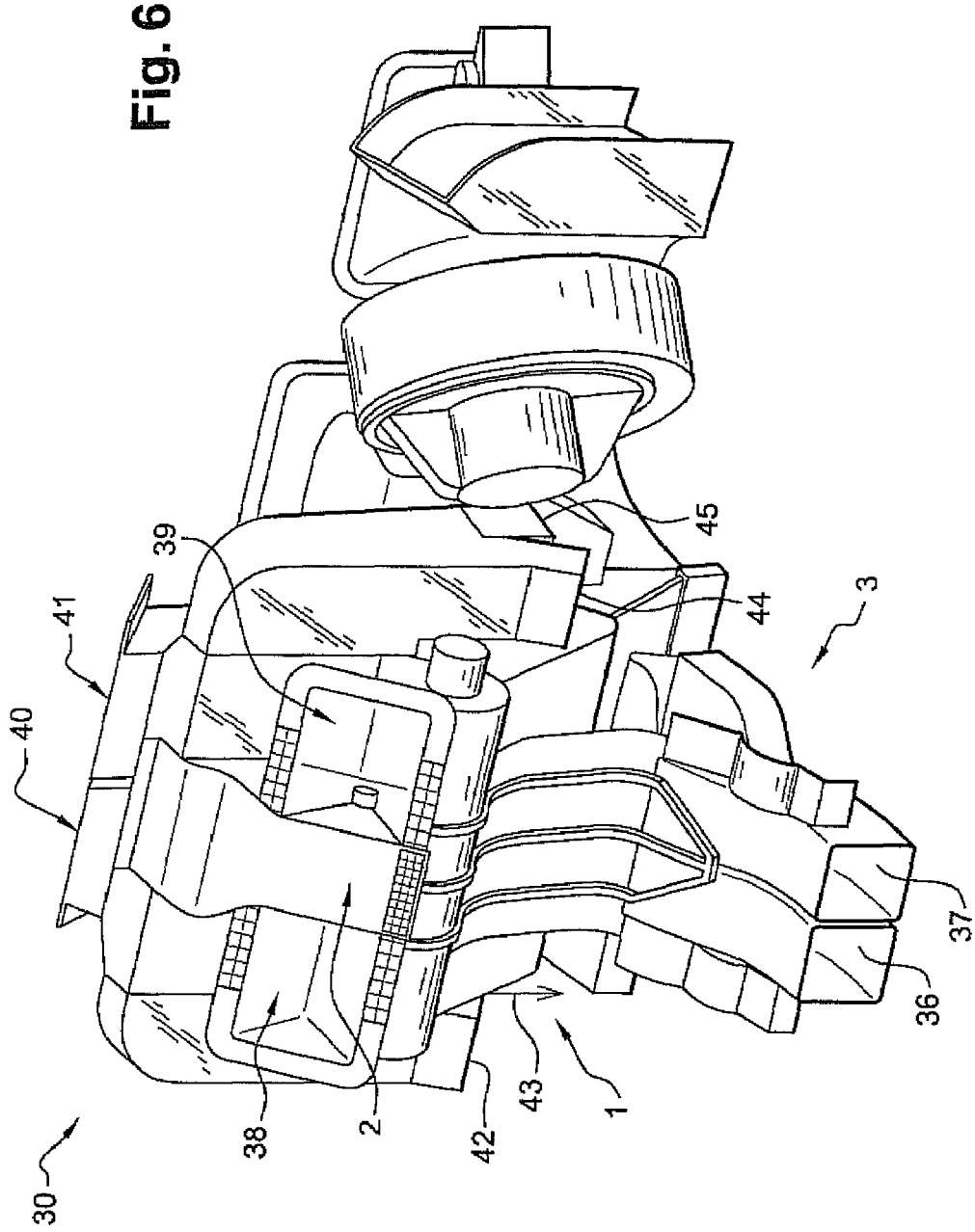
FIG. 6 shows a perspective view of the system housing from FIG. 5.

FIG. 6 shows a perspective view of the system housing 30 from FIG. 5. The same parts are provided with the same designations here. This view shows air channels 40, 41 which are formed by the housing parts 1, 2, 3, but were not clearly visible in the other figures.

The system housing 30 can be subdivided into two functional parts along the line of symmetry shown in FIG. 5. The left-hand part of the system housing 30 which is shown in FIG. 6 here is assigned the left-hand part of a vehicle interior (not illustrated) and the right-hand part is correspondingly assigned the right-hand part of the vehicle interior.

The air channels 36, 37 serve for channeling mixed air into the rear left-hand and right-hand parts of the vehicle interior. The air channels 38, 39 serve for channeling mixed air into the front left-hand and right-hand parts of the vehicle. The air channels 40, 41 serve for channeling hot air for defrosting purposes, 42/44 rear footwell, 43/45 front footwell.

An additional advantage is that it is easily possible for the air-channeling housing as a whole to be assembled in layers without any need for the housing to be turned or rotated for this purpose.

A possible assembly sequence will be described by way of example. In a first step, the first or left-hand housing part is positioned in an assembly arrangement and fitted out with the components for the first housing part. The second or central housing part is then preassembled with corresponding components. In a further step, the third or right-hand housing part is fitted out. Furthermore, the first and second housing parts or the left-hand and central housing parts are connected to one another. The right-hand housing part is then mounted on the central housing part. Finally, the external components, for example motors and kinematics, are mounted on the right-hand housing part.

In general terms, the present solution can provide an easy-to-assembly system housing which, in contrast to the prior-art solutions, rather than being constructed with a minimum number of housing parts, has as many housing components as are required for all the necessary air channels with associated air-channeling elements to be provided in the production process.

The invention thus provides an easy- and quick-to-assemble system housing, in particular for heating, ventilating and/air-conditioning systems of a vehicle, which, in addition, satisfies the stringent requirements in respect of sealing, rigidity and vibration resistance.

The invention claimed is:

1. A system housing (30), in particular for a heating, ventilating and/or air-conditioning system of a vehicle, comprising:
    at least a first housing part (1), a second housing part (2) and a third housing part (3) which serve for accommodating system components and for forming air-channeling paths (36, 37, 38, 39, 40, 41),
    the second housing part (2) including a first abutment surface and a second abutment surface disposed opposite the first abutment surface, up to which the first housing part (1) and the third housing part (3) are each advanced essentially parallel to a normal vector of the respective abutment surfaces on the second housing part (2), such that the second housing part (2) is disposed between the first housing part (1) and the third housing part (3); and
    the second housing part (2) including a first portion (20) defining a lateral cross section having a generally U-shaped portion (20) and further including a second portion (21) defining a lateral cross section having a generally T-shaped portion (21) cooperating with the U-shaped second portion (20) to define two air channels therebetween;
    wherein a leg of the T-shaped portion (21) defines a generally vertical line of symmetry with the first housing part (1) and one of the two air channels disposed on one side of the vertical line of symmetry and the third housing part (3) and the other of the two air channels disposed on an opposite side of the vertical line of symmetry such that the first housing part (1) is positioned for use as a left-side air-distributor housing, the second housing part (2) is positioned for use as a central air-distributor housing and the third housing part (3) is positioned for use as a right-side air-distributor housing.

2. A system housing (30) according to claim 1, characterized in that the normal vectors run essentially parallel.

3. A system housing (30) according to claim 1, characterized in that the first portion (20) and the second portion (21) are each advanced into engagement at right angles in relation to the direction of advancement of the first housing part (1) and the third housing part (3).

4. A system housing (30) according to claim 1 characterized in that at least one of a first group and a second group comprise air directing elements, wherein the first group includes the first housing part (1), the second housing part (2) and the third housing part (3) and the second group includes the first portion (20) and the second portion (21).

5. A system housing (30) according to claim 1 characterized in that at least one of a first group and a second group include sealing lips, wherein the first group includes the first housing part (1), the second housing part (2) and the third housing part (3) and the second group includes the first portion (20) and the second portion (21).

6. A system housing (30) according to claim 1 characterized in that at least one of a first group and a second group include undercut-free injection moldings, wherein the first group includes the first housing part (1), the second housing part (2) and the third housing part (3) and the second group includes the first portion (20) and the second portion (21).

* * * * *